US 6,669,599 B2

(12) United States Patent
Iwase et al.

(10) Patent No.: US 6,669,599 B2
(45) Date of Patent: Dec. 30, 2003

(54) SHIFT CONTROL APPARATUS FOR AN AUTOMATIC TRANSMISSION

(75) Inventors: Masakatsu Iwase, Anjo (JP); Masayuki Sugiura, Anjo (JP); Masamichi Unoki, Anjo (JP); Mitsunori Nakane, Anjo (JP); Kazuo Koumura, Anjo (JP); Muneo Kusafuka, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/000,801

(22) Filed: Dec. 4, 2001

(65) Prior Publication Data
US 2002/0072449 A1 Jun. 13, 2002

(30) Foreign Application Priority Data
Dec. 7, 2000 (JP) ......................... 2000-373515

(51) Int. Cl.⁷ .................. F16H 59/60; F16H 59/62; G06F 17/00; G06F 19/00; G06F 7/00
(52) U.S. Cl. .................. 477/97; 477/109; 477/110; 701/66
(58) Field of Search .................. 477/97, 110, 107, 477/108, 109; 701/51, 65, 66

(56) References Cited

U.S. PATENT DOCUMENTS

| 5,103,398 A | * | 4/1992 | Akiyama | 701/54 |
| 5,415,600 A | * | 5/1995 | Mochizuki et al. | 477/110 |

FOREIGN PATENT DOCUMENTS

| EP | 0301558 A2 | * | 2/1989 | B60K/28/16 |
| JP | 60-176828 | | 9/1985 | |

* cited by examiner

Primary Examiner—Tisha D Lewis
(74) Attorney, Agent, or Firm—Lorusso, Loud & Kelly

(57) ABSTRACT

A shift control apparatus for an automatic transmission eliminates or reduces a sense of discomfort to the driver and other occupants during slip, while maintaining the necessary driving force. When slip is determined by detection of wheel speed, a slip signal is output. A controller which receives the slip signal outputs a maintaining signal for maintaining the gear stage which existed at the time the slip signal was received, until a predetermined period of time has passed. If the slip continues after the predetermined period of time, the controller outputs a shift signal to the automatic transmission to shift it to a predetermined gear stage, thus reducing driving force and preventing slip from continuing. If the slip stops within the predetermined period of time, the slip signal is canceled such that the current gear stage is maintained and no shift is executed.

24 Claims, 15 Drawing Sheets

SHIFT CONTROL APPARATUS FOR AN AUTOMATIC TRANSMISSION

BACKGROUND OF THE INVENTION

1. Field of the Invention

The present invention relates generally to a shift control apparatus in an automatic transmission mounted in an automobile, and more particularly to an apparatus for controlling shifting when driven wheels of the automobile slip.

2. Description of Related Art

Conventionally, a shift control apparatus for an automatic transmission for shifting from a low gear stage to a high gear stage when driven wheels of an automobile slip during take-off, is disclosed in the publication of JPA SHO 60-176828. According to this art, when the driven wheels slip on a road with a low friction surface, such as a wet or icy road, a sensor and the like detects that slip and outputs a slip signal to a shift control apparatus for an automatic transmission. The shift control apparatus then receives the slip signal and performs shift control to shift the automatic transmission from a low gear stage with a large transfer torque to a high gear stage with a small transfer torque. This decreases the driving force transmitted to the driven wheels and thereby prevents continued slipping.

With this shift control apparatus for an automatic transmission, however, when slip of the driven wheels is detected, the shift control apparatus immediately performs shift control to shift the automatic transmission into a high gear so that even when the driven wheels slip on a normal road, which is not a road with a low friction surface as described above, or so-called wheel spin occurs temporarily, the shift control is performed to shift the automatic transmission into a high gear stage. Because of this, even if temporary wheel spin stops thereafter such that the driven wheels are no longer slipping, the automobile temporarily runs in a high gear stage with low torque against the will of the driver, thereby giving the driver and other occupants a sense of discomfort and making the necessary driving force unable to be achieved.

SUMMARY OF THE INVENTION

Therefore, it is an object of the present invention to provide a shift control apparatus for an automatic transmission which eliminates or reduces the sense of discomfort felt by the driver and other occupants and which is able to achieve the necessary driving force when slip occurs, particularly during take-off.

DETAILED DESCRIPTION OF PREFERRED EMBODIMENTS (First Embodiment)

Figure 1:
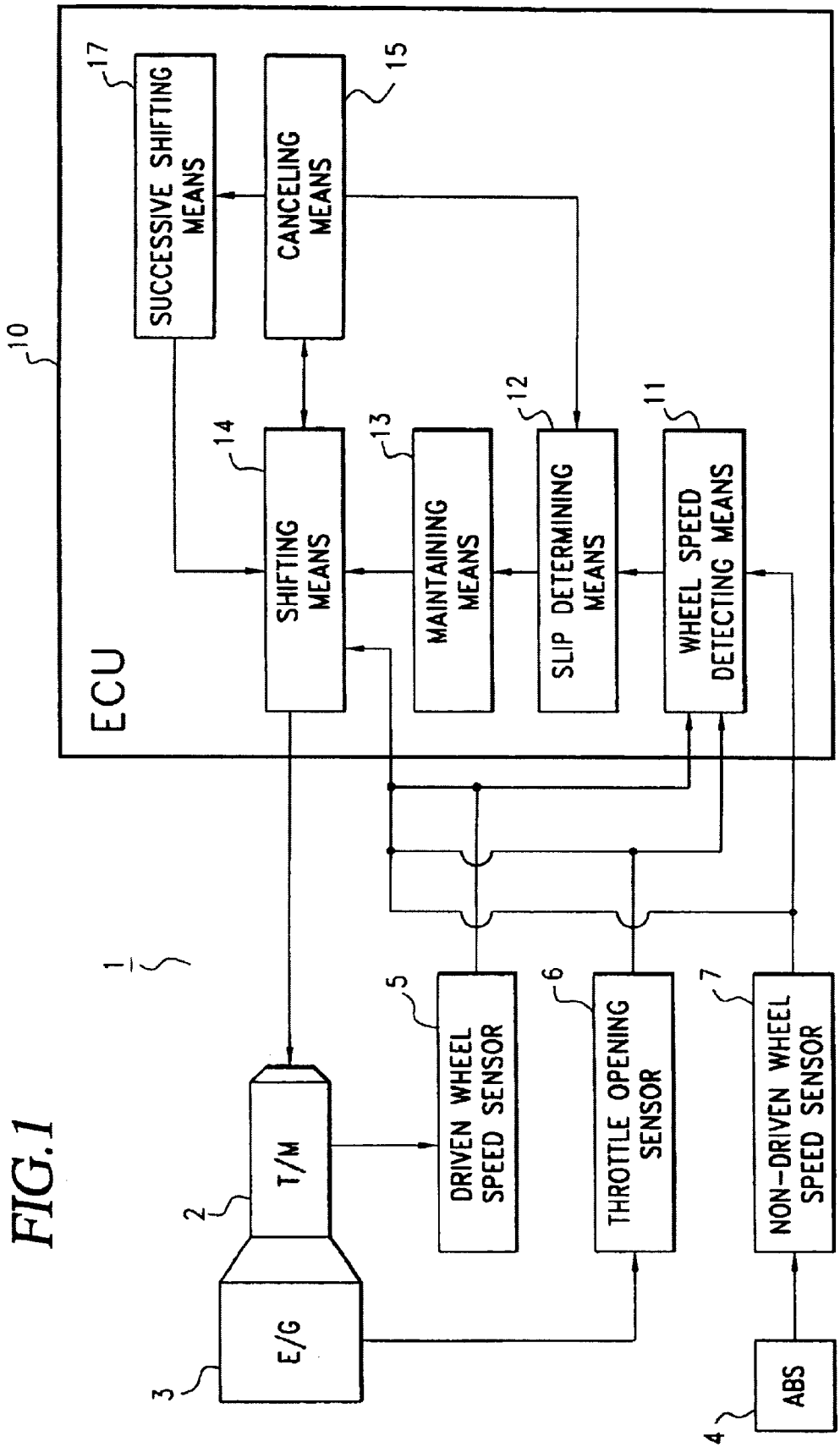
FIG. 1 is a block view showing a shift control apparatus for an automatic transmission according to a first embodiment of the present invention.

Hereinafter, a first embodiment of the present invention will be described referring to FIGS. 1 through 9. Referring to FIG. 1, a shift control apparatus 1 for an automatic transmission according to the present invention includes an automatic transmission 2 for shifting a driving force input from an engine 3 via an input shaft, not shown, to a plurality of gear stages and outputting that driving force to driven wheels via an output shaft, and a control unit (ECU) for controlling the shifting of the automatic transmission 2. This shift control apparatus 1 is further provided with an anti-lock brake system (hereinafter referred to as ABS) 4 for preventing lockup of the wheels based on the speed of each wheel during braking.

A driven wheel speed sensor 5 for detecting the speed of the driven wheels is provided on the output shaft of the automatic transmission 2 which is coupled with the driven wheels, not shown. A throttle opening sensor 6 for detecting an accelerator opening is provided in the engine 3. Moreover, in the ABS 4 is provided a non-driven wheel speed sensor 7 for detecting, for example, the speed of the rear wheels in front wheel drive vehicles, or the speed of the front wheels in rear wheel drive vehicles. Furthermore, a control unit 10 includes wheel speed detecting means 11, slip determining means 12, maintaining means 13, shifting means 14, canceling means 15, and successive shifting means 17.

The wheel speed detecting means 11 is connected to the driven wheel speed sensor 5, throttle opening sensor 6, and the non-driven wheel speed sensor 7, and detects the speeds of the driven wheels and the non-driven wheels as well as the difference in those speeds, which it outputs to the slip determining means 12. The slip determining means 12 then determines whether the wheels are slipping based on the difference in speed between the driven wheels and the non-driven wheels inputted by the wheel speed detecting means 11. If it is determined that the wheels are slipping, a slip signal is output to the maintaining means 13. When the maintaining means 13 receives a slip signal, it outputs a maintaining signal for maintaining, for a predetermined time, a gear stage at the point during which the slip signal was input to the shifting means 14.

Figure 2:
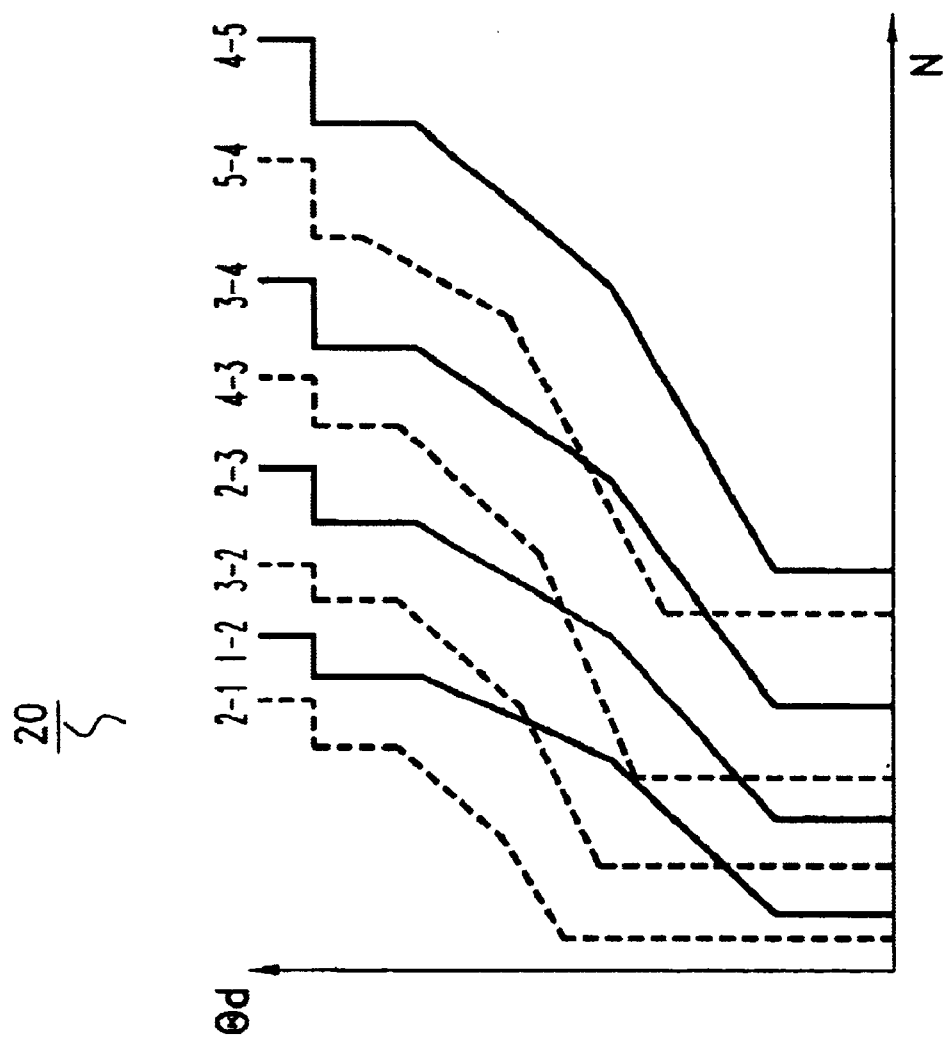
FIG. 2 is a shift diagram of five forward gear stages.

The shifting means 14 is connected to the driven wheel speed sensor 5 and the throttle opening sensor 6. During normal running, a shift signal based on the vehicle speed detected by the speed of the driven wheels and the throttle opening $\theta d$ is output to the automatic transmission 2, after referencing a five forward gear stage shifting diagram (to be described in detail later) as shown in FIG. 2, for example. Meanwhile, when a maintaining signal is input by the maintaining means 13 when slip occurs, the shifting means 14 outputs to the automatic transmission 2 a shift maintaining signal for maintaining for a predetermined period of time the gear stage at the point during which the signal was input, as described above. Then when the slip determining means 12 determines after a predetermined period of time that slip is occurring and continues to output a slip signal, the shifting means 14 receives the slip signal via the maintaining means 13 and outputs a shift during slip signal for a predetermined gear stage to the automatic transmission 2. The shifting means 14 also outputs a shift signal during normal running when the slip determining means 12 determines that no slip is occurring after a predetermined period of time and stops outputting the slip signal.

The canceling means 15 is connected to the shifting means 14 so as to be able to both input therefrom and output thereto. In the event that the shifting means 14 outputs a shift during slip signal for a predetermined gear stage to the automatic transmission 2, when the speed of the non-driven wheels reaches a shift speed of a predetermined gear stage, after referencing the shifting diagram in FIG. 2 for the speed of the non-driven wheels via the shifting means 14, a cancel signal for canceling the shift during slip signal is output to the slip determining means 12. Also, when the canceling means 15 cancels the shift during slip signal, a speed difference may result due to a difference in speed between the driven wheels and the non-driven wheels because the shifting means 14 refers to the shifting diagram in FIG. 2 for the speed of the driven wheels. In regard to this, the canceling means 15 outputs a cancel signal to the shifting means 14 via the successive shifting means 17, and the successive shifting means 17, having received that signal, then outputs to the shifting means 14 a successive shift signal so that successive shifting is performed for a fixed period of time. After the shifting means 14 performs shifting based on the successive shift signal, it then returns the running state of the vehicle to the normal running state.

Next, the shifting diagram for performing shift determination based on the speed of the wheels and the throttle opening will be described. A so-called map 20, which is a shifting diagram like that shown in FIG. 2, is stored in advance in the control unit 10. A shift point which becomes the reference during shifting is detected based on the throttle opening $\theta d$ and the speed N of the wheels. The points at which 1–2, 2–3, 3–4, and 4–5, shown by the solid line in the figure, cross over from left to right in the figure, which is the direction in which the speed N of the wheels increases and the direction in which the throttle opening decreases, become shift points for up-shifts of 1–2, 2–3, 3–4, and 4–5, respectively. And the points at which 5–4, 4–3, 3–2, and 2–1, as shown by the broken line in the figure, cross over from right to left in the figure, which is the direction in which the speed N of the wheels decreases and the direction in which the throttle opening increases, become shift points for down-shifts of 5–4, 4–3, 3–2, and 2–1, respectively. The respective means of the control unit 10 are able to constantly reference the shift points based on the map 20, and determine the running state of the vehicle by referencing this map 20 based on the throttle opening $\theta d$ and the speed N of the wheels.

Figure 3:
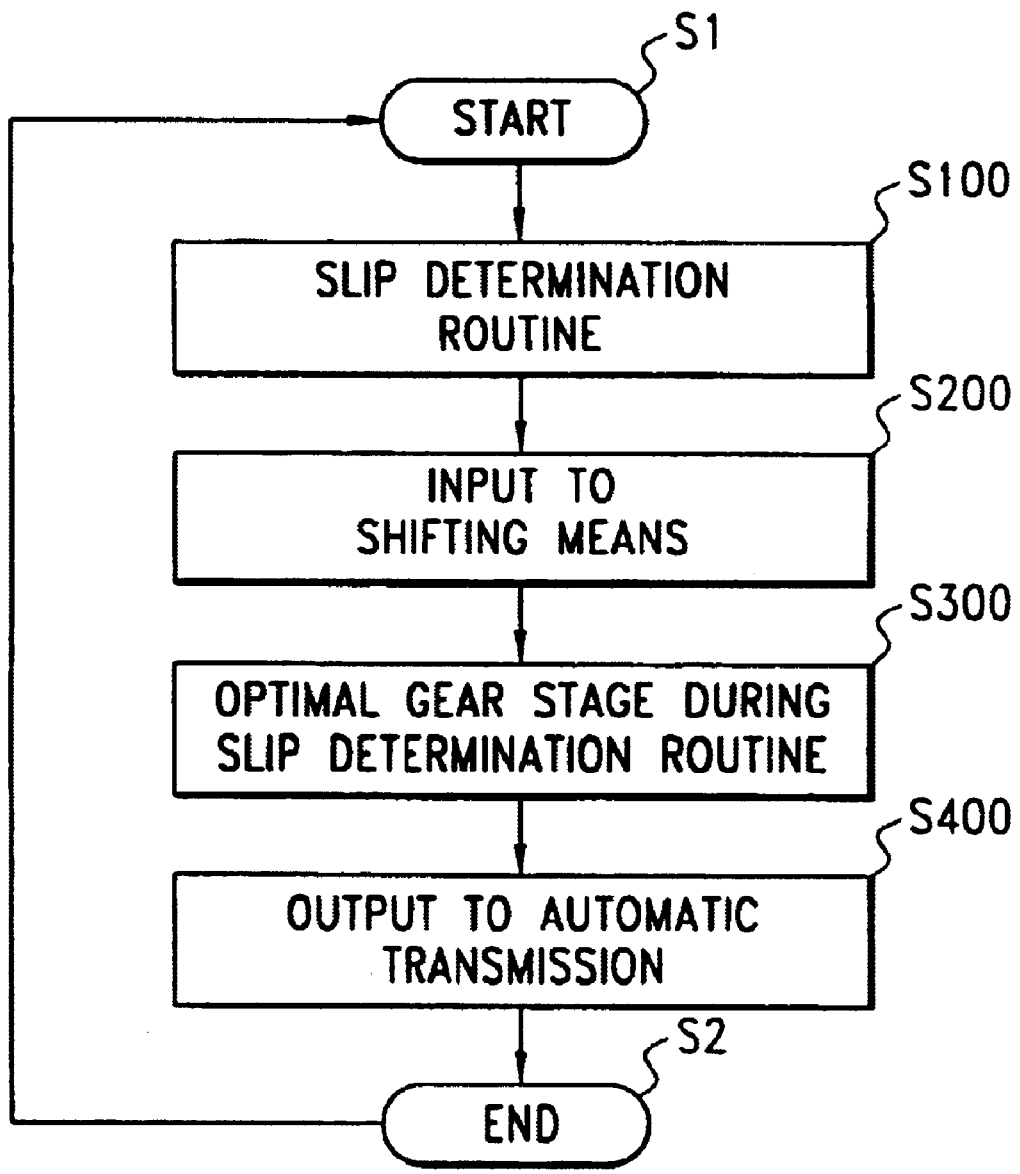
FIG. 3 is a flow chart showing slip control.
Figure 4:
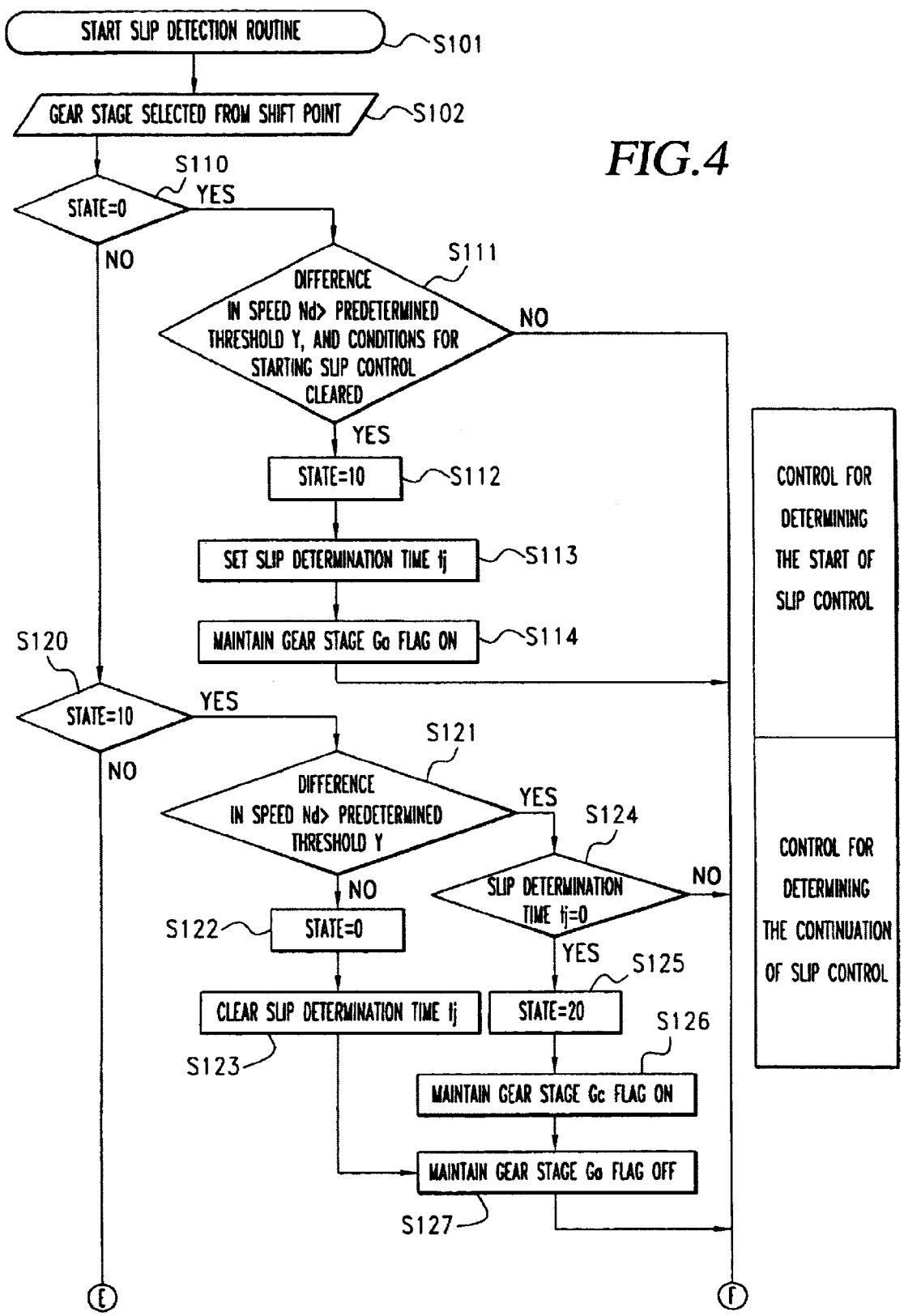
FIG. 4 is a first part of a flow chart which shows the first two sections of a five section slip detection routine.
Figure 5:
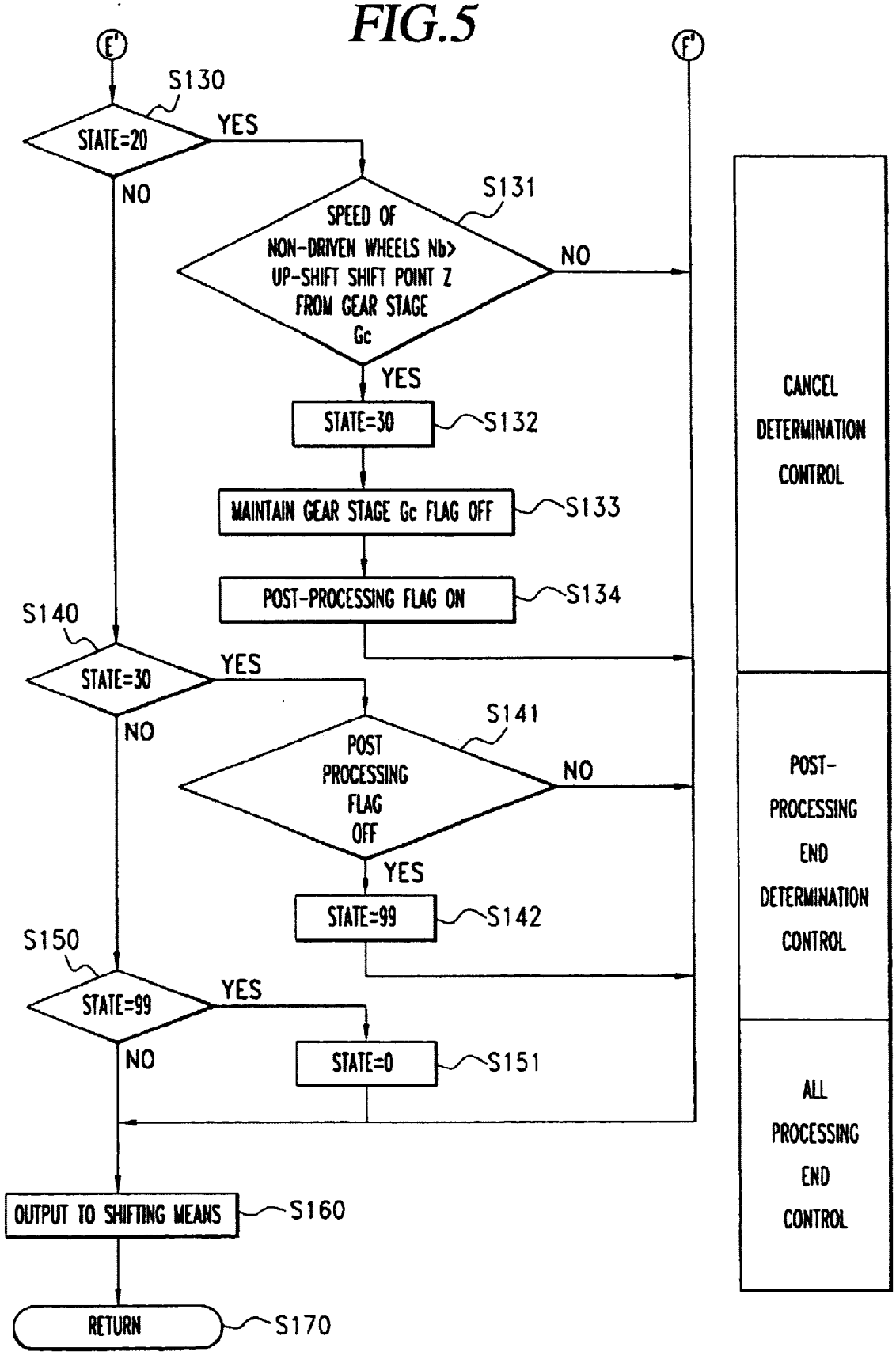
FIG. 5 is a second part of the flow chart in FIG. 4, which shows the following three sections of the five section slip detection routine.
Figure 6:
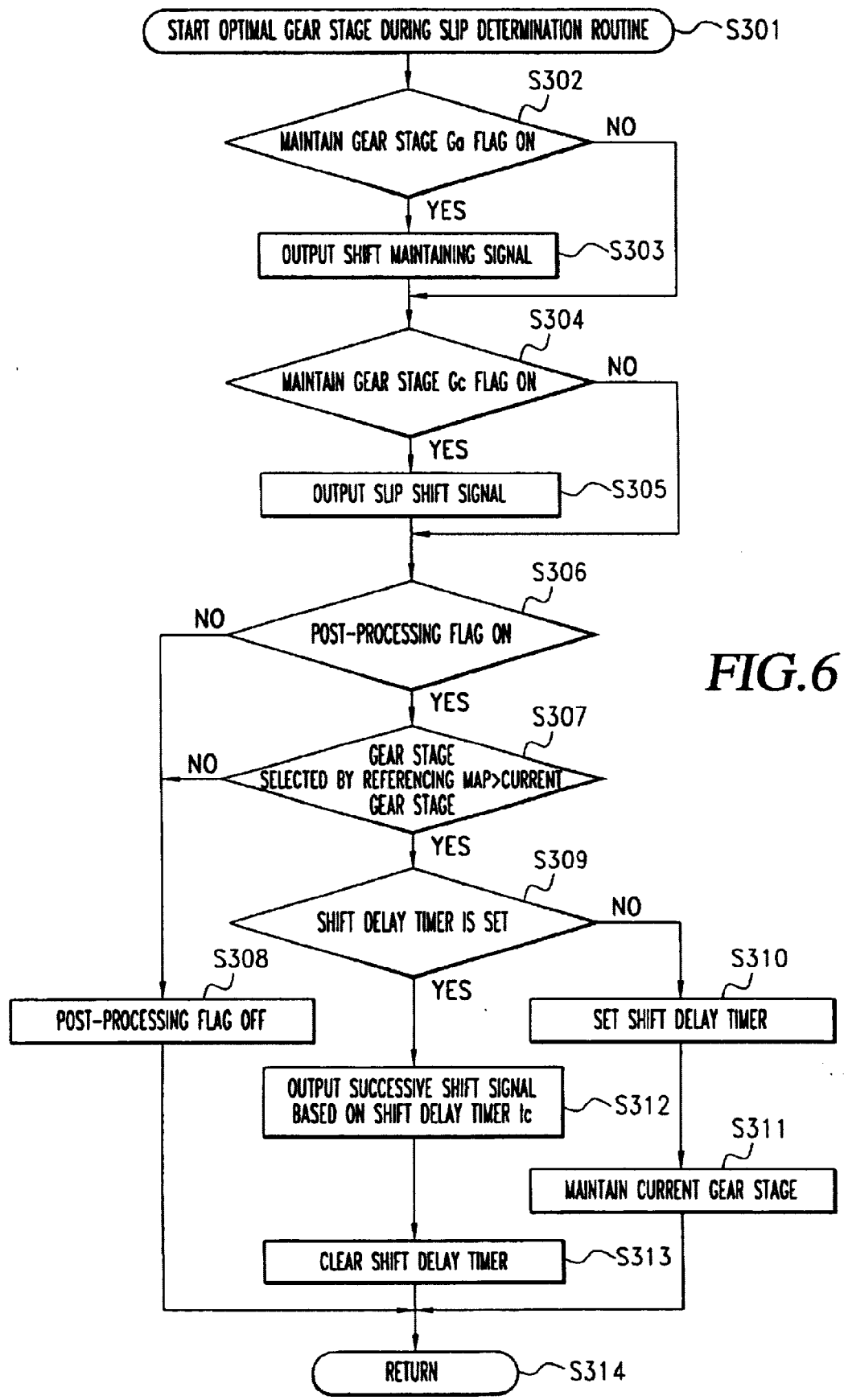
FIG. 6 is a flow chart showing an optimal shift determination during slip routine.

Control of the shift control apparatus 1 for the automatic transmission according to the present invention is shown in FIGS. 3 through 10. The flowcharts shown in FIG. 4 and FIG. 5 are continuous. "E" in FIG. 4 is connected to "E" in FIG. 5 and "F" in FIG. 4 is connected to "F" in FIG. 5.

With the slip control, as shown in FIG. 3, when a driver starts the engine for example, slip control begins (S1) and a slip detection routine S100, to be described in detail later, is performed. In this slip detection routine S100, the wheel speed detecting means 11 outputs information based on each sensor to the slip determining means 12, and the slip determining means 12 and the maintaining means 13 generate a slip signal, maintaining signal, or post-processing signal. The generated signal is then input to the shifting means 14 (S200) and an optimal gear stage during slip determination routine S300 is then performed. In this optimal gear stage during slip determination routine S300, a normal shift signal, slip shift signal, shift maintaining signal or successive shift signal is generated. Each shift signal that is generated is then output to the automatic transmission 2 (S400). When the above control ends (S2), the process returns to the start and slip control is repeated.

In the slip detection routine S100, as shown in FIGS. 4 and 5, the wheel speed detecting means 11 first obtains information such as the speed of the driven wheels Na, the speed of the non-driven wheels Nb, and the throttle opening $\theta d$, and then confirms the gear stage selected from the shift point referencing the map 20 (S102). Then, being that the control state is the initial state State=0, control for determining the start of slip control is performed (S110). When this happens, determination to start slip control is performed (S111) with the following as the conditions for starting slip control: the difference in speed Nd between the driven wheels and the non-driven wheels is greater than the predetermined threshold Y, the throttle opening $\theta d$ must be within a predetermined range, the speed of the non-driven wheels Nb must be equal to or less than a predetermined speed, and vehicle posture control (control for maintaining vehicle posture by controlling, for example, the fuel injection in the engine when slip is likely to occur due to excessive vehicle speed during cornering, for example) must not be being performed.

Figure 7:
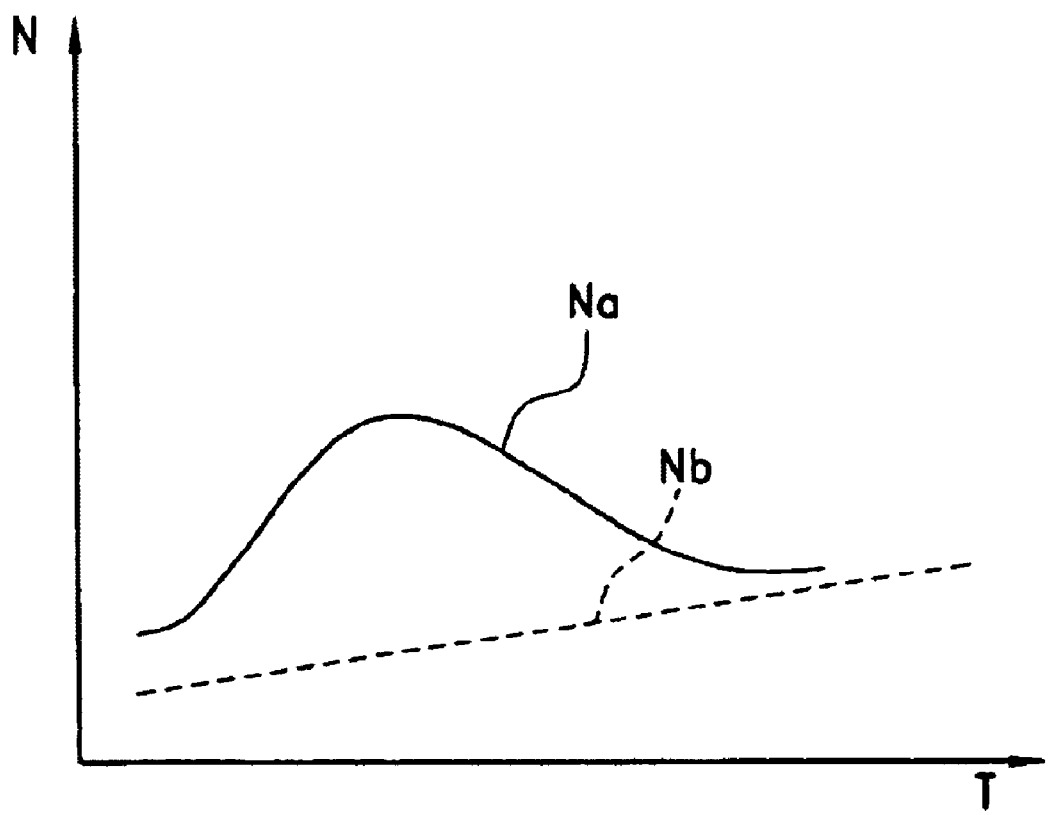
FIG. 7 is a time chart showing the speeds of driven wheels and non-driven wheels during slip.

Meanwhile, as shown in FIG. 7, when slip occurs a difference in speed Nd is generated between the speed of the driven wheels Na and the speed of the non-driven wheels Nb. With respect to this, as shown in FIG. 8(*a*), when the difference in speed Nd between the driven wheels and the non-driven wheels at a time T1 becomes greater than a predetermined threshold Y and the conditions for starting slip control are cleared, the slip determining means 12 determines that there is slip and outputs a slip signal, while starting slip control (S111). When this happens, the control state is made State=10 (i.e. a flag is posted so as to move to State=10 [S120] in the next routine) (S112) to perform the next control for determining the continuance of slip control, and the maintaining means 13 into which the slip signal was input sets a slip determining time tj (S113). Then a maintain gear stage Ga (a gear stage at the point during which the slip signal was input, e.g., first speed) flag is turned ON (S114). When the control for determining the start of slip control is completed, a maintaining signal is output to the shifting means 14 based on the fact that the maintain gear stage Ga flag is ON (S160), and the routine returns (S170).

As the conditions for starting slip control in Step S111 as described above, the throttle opening must be within a predetermined range, the speed of the non-driven wheels Nb must be equal to or less than a predetermined speed, and vehicle posture control must not be being performed. When even one of these conditions for starting slip control is not met (any one of these conditions, depending), the slip control does not start and the routine proceeds to Step S160 in which the shifting means 14 performs shift control for normal running. With the conditions for starting slip control, a slip signal can be output when the throttle opening is within the predetermined range, thereby preventing engine stop due to shifting into a high gear stage while the throttle opening is small, as well as preventing high gear stage rotation of the driven wheels due to shifting into a high gear stage while the throttle opening is large. Also, because the slip signal can be output when the speed of the non-driven wheels is equal to or less than a predetermined speed, slip control can be performed only during take off, when slip has a tendency to occur, such that control is not performed accidentally. Furthermore, because a slip signal can be output when vehicle posture control is not being performed, shifting due to slip control being carried out while vehicle posture control is being executed is prevented so that the vehicle posture does not change at times when it is unstable, such as during cornering, for example.

Next, because slip control has started and the control state is State=10 from Step S112, control for determining continuance of slip control is performed. According to this control for determining continuance of slip control, it is first determined whether the difference in speed Nd between the driven wheels and the non-driven wheels is equal to or less than the predetermined threshold Y (S121). If the difference in speed Nd is greater than the predetermined threshold Y, then it is determined whether the slip determination time tj has become 0 (S124). If the slip determination time tj has not become 0 (has not ended), the maintaining signal continues to be output to the shifting means 14 (S160), and the routine returns (170).

Figure 9A:
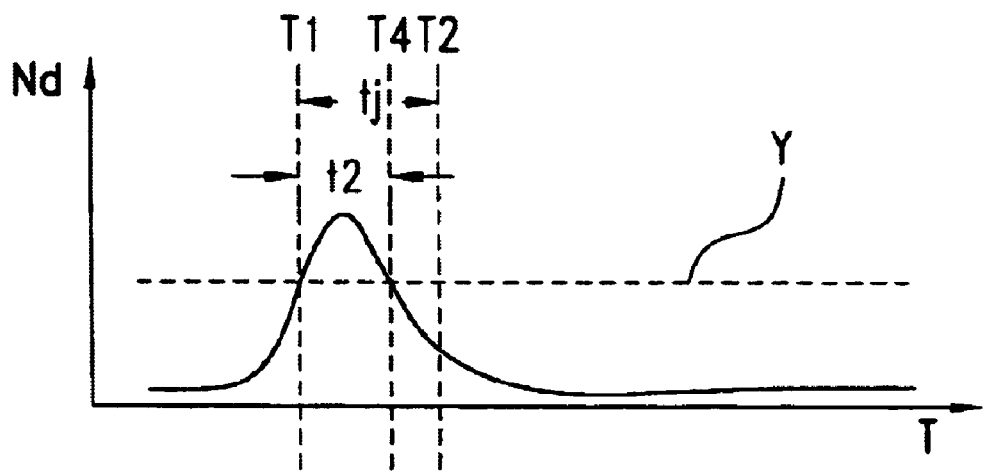
FIG. 9 shows a state in which there is temporary slip, with (a) being a time chart showing the difference in speed between driven wheels and non-driven wheels, and (b) being a time chart showing gear stages.
Figure 9B:
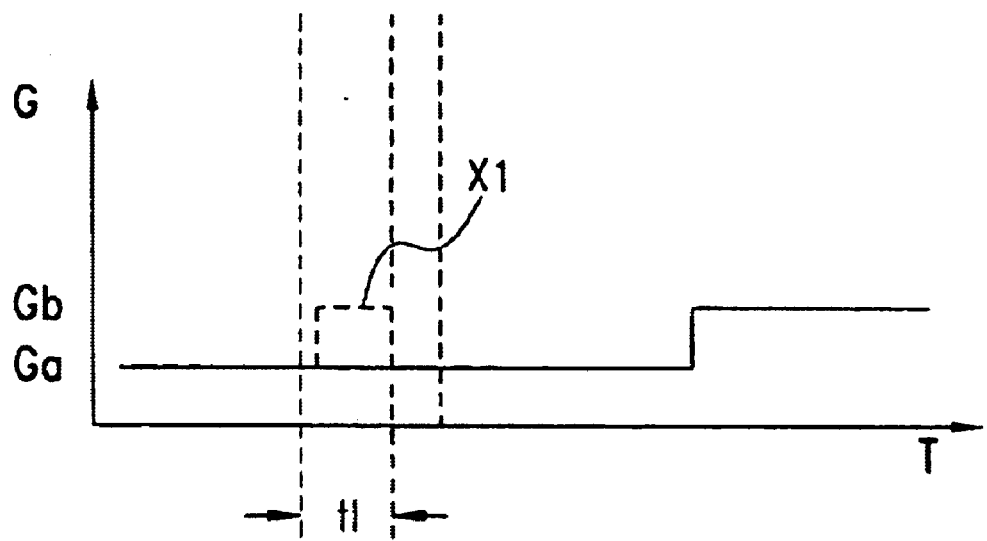

If the slip is only temporary when the routine proceeds via Step S120, from Step S112, to Step S121 and it is determined whether the difference in speed Nd between the driven wheels and the non-driven wheels is equal to or less than the predetermined threshold Y, then the difference in speed Nd becomes equal to or less than the predetermined threshold Y at a time T4, as shown in FIG. 9. Then the routine proceeds to Step S122 where the control state returns to the initial state State=0, and the slip determination time tj is cleared (S123) while the maintain gear stage Ga flag is turned OFF (S127). That is, because the slip is only temporary, the maintaining signal is canceled and the shifting means 14 performs shift control for normal running. By controlling in the manner described above, the gear stage Ga at the point during which the slip signal was input is maintained for the maintaining time t1 without shift control in which the gear stage is shifted from the gear stage Ga (e.g. first speed) to a gear stage Gb (e.g. second speed) referenced from the map 20 from the speed Na of the driven wheels, as shown by the broken line X1 in FIG. 9, being performed. In other words, it is possible to temporarily restrict shifting into a high gear stage, thereby eliminating or reducing the sense of discomfort to the driver as well as enabling the necessary driving force to be obtained.

Figure 8A:
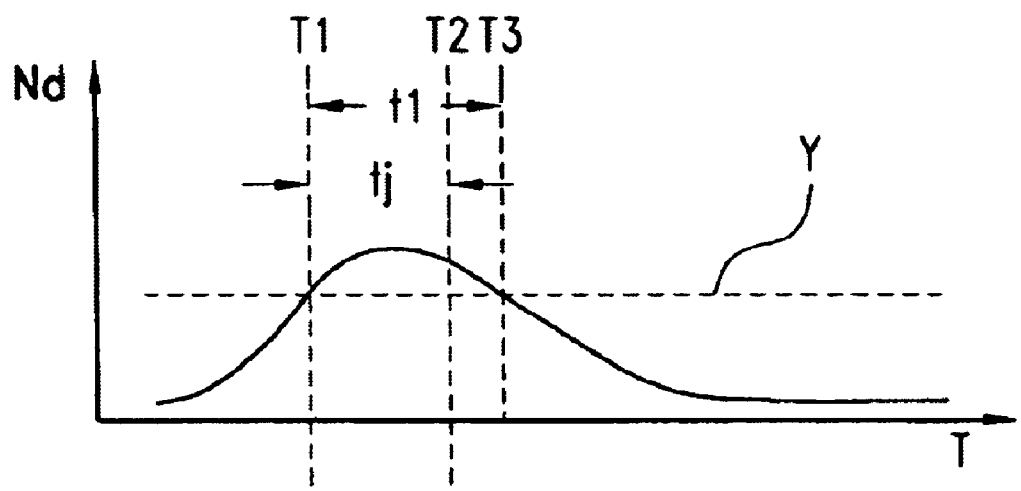
FIG. 8 shows a state in which there is continued slip, with (a) being a time chart showing the difference in speed between driven wheels and non-driven wheels, and (b) being a time chart showing gear stages.
Figure 8B:
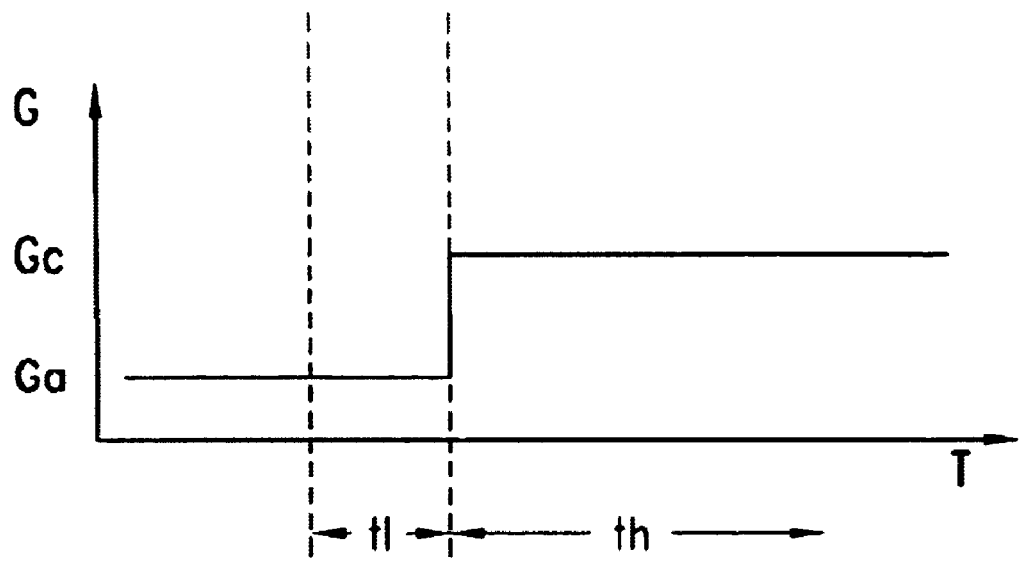

Conversely, if the slip is continuous when the routine proceeds through Step S120 to Step S121 again as described above and it is determined whether the difference in speed Nd between the driven wheels and the non-driven wheels is greater than the predetermined threshold Y, then the slip determination time tj becomes 0 at time T2 while the difference in speed Nd remains greater than the predetermined threshold Y, as shown in FIG. 8(a). This results in a determination that slip is continuing. When this happens, the control state is made a cancel determination state State=20 (S125), a gear stage Gc flag turns ON (S126), and the maintain gear stage Ga flag turns OFF. Then when a slip signal indicating that the maintain gear stage Gc flag is ON is output to the shifting means 14 (S160), the gear stage is shifted to a gear stage Gc (for example, third speed) which is a predetermined gear stage at time T2, as shown in FIG. 8(b). Even if the difference in speed Nd is equal to or less than the predetermined threshold Y at time T3, the shift is maintained for a high speed maintaining time th so as to decrease the transmission torque of the automatic transmission 2. In other words, decreasing the driving force transmitted to the driven wheel prevents the wheels from continuing to slip.

Figure 10A:
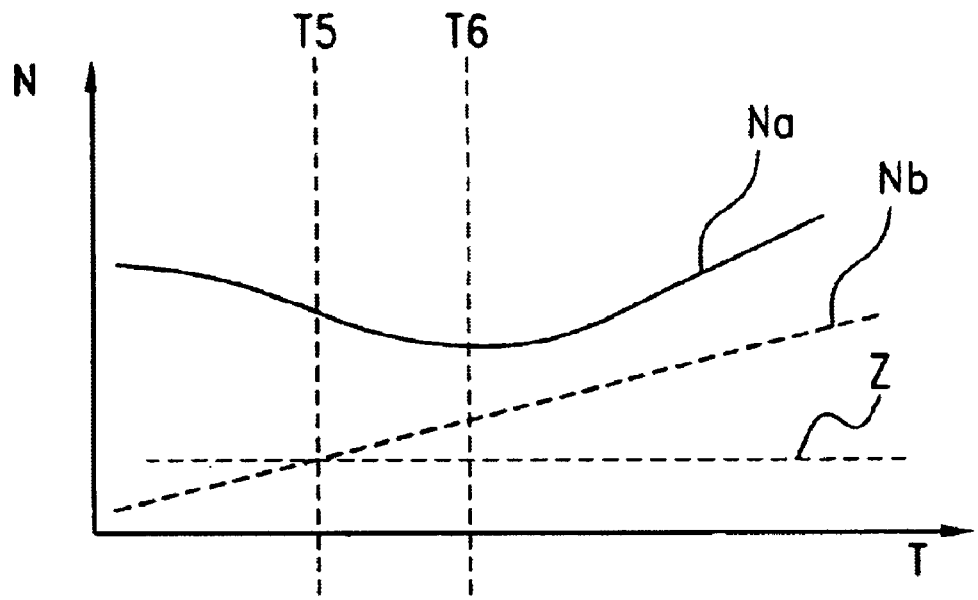
FIG. 10 shows a state in which slip control is canceled, with (a) being a time chart showing the difference in speed between driven wheels and non-driven wheels, and (b) being a time chart showing gear stages.

Because the control state is the cancel determination state State=20 in Step S125 when the automatic transmission is shifted to the gear stage Gc as described above (S130), cancel determination control shown in FIG. 5 starts. According to this cancel determination control, as shown in FIG. 10(a), the slip signal in which the maintain gear stage Gc flag is ON is output to the shifting means 14 during the high speed maintaining time th (S160) until the speed of the non-driven wheels Nb reaches an up-shift speed point Z from the gear stage Gc which is able to be obtained referencing the map 20 (S131). When the speed of the non-driven wheels Nb becomes greater than the up-shift speed point Z from the gear stage Gc at a time T5 (S131), the slip determining means 12 inputs a cancel signal from the canceling means 15 so that the control state becomes a post-processing determination state State=30 (S132). Then, the maintain gear stage Gc flag turns OFF (S133) and the post-processing flag turns ON (S134). When this happens, the high speed maintaining time th ends and the maintaining of the gear stage Gc is canceled, i.e. the slip signal is no longer output to the shifting means 14 and a post-processing signal is output thereto (S160). At this time, because the cancel signal is not output until the speed of the non-driven wheels Nb becomes greater than the up-shift speed point Z from the gear stage Gc, the shift signal is canceled while in a slip state so that down-shifting does not occur. Note that referencing the up-shift speed point Z from the speed of the non-driven wheels Nb which are not slipping enables an accurate running state of the vehicle to be determined.

Following this, because the control state is the post-processing determination state State=30 from the Step S132, the post-processing determination completion control is started (S140) and the post-processing flag is turned OFF (S141) and the control state is made a total processing complete state State=99 (S142). After the post-processing signal is output to the shifting means 14 (S160), the total processing completion control is started (S 150) by the shift control state to State=99 so as to return the control state to the initial state State=0 (S151), thus completing the slip detection routine 100.

Next, an optimal gear stage during slip determination routine S300 will hereinafter be described. The optimal gear stage during slip determination routine S300 starts when a driver starts the engine, for example (S301). In a state in which there is no slip signal, maintaining signal, and post-processing signal input to the shifting means 14, because the maintain gear stage Ga flag, maintain gear stage Gc flag, and post-processing flag are not ON, the routine proceeds through Step S302, Step S304, Step S306, and Step S308 to Step S314 where it returns and repeats. That is, because the vehicle is running normally in a state in which no slip is occurring, the shifting means 14 outputs a normal shift signal to the automatic transmission 2 based on the map 20.

When slip occurs and a maintaining signal is input to the shifting means 14 according to the aforementioned slip determination routine 100, because the maintain gear stage Ga flag is turned ON in Step S114 (S302) the shifting means 14 outputs a speed maintaining signal for maintaining the gear stage Ga to the automatic transmission 2 such that the gear stage Ga is maintained (S303). Then, if the slip is only temporary, the maintain gear stage Ga flag is turned OFF in Step S127 (S302) and the running state of the vehicle returns to the normal running state. If the slip continues, however, the maintaining signal is canceled such that the maintain gear stage Ga flag is turned OFF in Step S127 (S302), while a slip signal is input to the shifting means 14 such that the maintain gear stage Gc flag is turned ON in Step S126 (S304) and the shifting means 14 outputs a slip shift signal to the automatic transmission 2 (S305). As a result, the automatic transmission 2 which has shifted to the gear stage Gc reduces the transfer torque, i.e. performs slip control.

Following this, when the speed of the non-driven wheels Nb exceeds the shift point Z, a cancel signal is input to the slip determining means 12 by the canceling means 15 and a post-processing signal is input to the shifting means 14 in the slip determination routine 100. When this happens, because the post-processing flag is turned ON in Step S134 (S306), a speed is selected referencing the map based on the speed of the driven wheels Na. When the selected speed is a speed which is not higher than the current speed Gc (S307), because it matches the normal speed, the post-processing flag is turned OFF in Step S141 (S308) and the running state of the vehicle returns to the normal running state.

When the selected gear stage is a speed which is higher than the current gear stage Gc (S307), however, it is determined whether a shift delay timer tc is set (S309). If the shift delay timer tc is not set, then it is set at this point (S310). At this time the shifting means 14 outputs a signal to maintain the current gear stage Gc (S311) and the routine returns (S314). The routine then proceeds again, just as described above, up to Step S309 and because the shift delay timer tc is now set, the successive shifting means 17, which has received a cancel signal from the canceling means 15, outputs a successive shift signal based on the shift delay timer tc to the shifting means 14 (S312). When this happens, the automatic transmission is shifted to and maintains a gear stage Gd based on the shift delay timer tc for a period of time from the time T5, at which point the slip signal was canceled, to a time T6, as shown in FIG. 10(b).

Then when the shift delay timer tc is cleared (S313) and the routine returns, the routine again proceeds to Step S307 where a gear stage is selected referencing a map based on the speed of the driven wheels Na. If the selected gear stage is a speed which is not higher than the current gear stage Gd (S307), because it matches the normal gear stage, the post-processing flag is turned OFF (S308) and the running state of the vehicle returns to the normal running state.

Moreover, when the gear stage selected based on the speed of the driven wheels Na is a gear stage Ge which is an even higher gear stage (S309), the shift delay timer tc is set (S310) and the current gear stage Gd is maintained (S311) as described above. Furthermore, after the routine returns a successive shift signal is output to the shifting means 14 (S312). Then, after the shift delay timer tc has been cleared, the routine returns and a gear stage is again selected. If a selected gear stage Ge is the highest gear stage, for example, then because a selected gear stage is not a gear stage which is higher than the current gear stage Ge (S307), the post-processing flag is turned OFF (S308) and the running state of the vehicle returns to the normal running state, i.e., slip control ends.

Figure 10B:
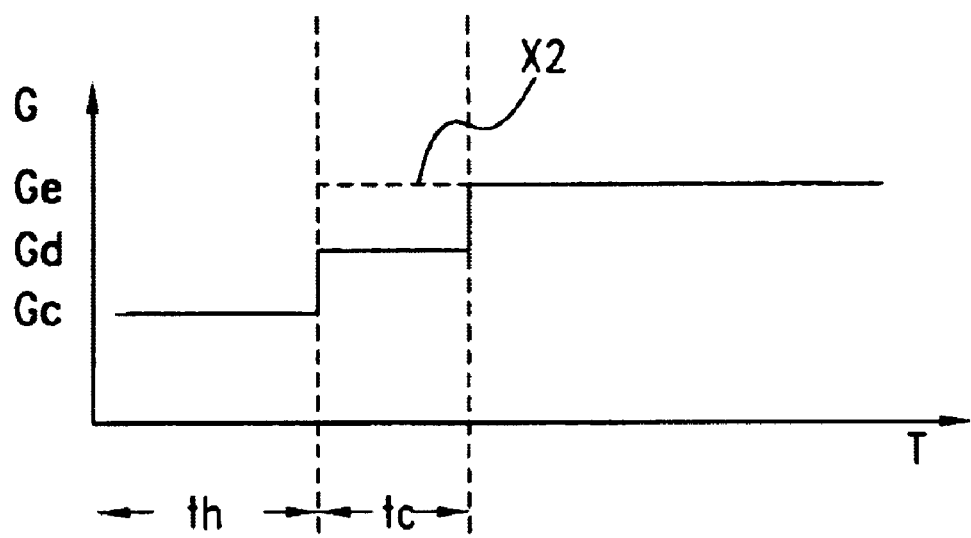

By performing the optimal gear stage during slip determination routine S300 in the manner described above, even if the gear stage selected based on the map 20 according to the speed of the driven wheels Na, as shown by a broken line X2 in FIG. 10(b), is the gear stage Ge, for example, because the gear stage is maintained once at the gear stage Gd for the predetermined period of time according to the shift delay timer tc, successive shifting is possible without shifting directly to the gear stage Ge. That is, even if there is a difference of two or more steps, for example, between a predetermined gear stage (for example, third speed) which was shifted into when slip control was being performed and a gear stage (for example, fifth speed) selected based on the speed of the driven wheels Na when slip control was canceled, slip control ends after successive shifting is performed at predetermined intervals. This eliminates a sense of discomfort felt by the driver as well as enables the necessary driving force to be obtained.

It should be noted that in this embodiment, the slip state is determined based on the difference in speed Nd between the speed of the driven wheels Na and the speed of the non-driven wheels Nb. However, the present invention is not limited to this; the slip state may also be able to be determined based on a parameter such as a change in the rotation acceleration. Further, any means may be used as long as the slip state is able to be detected.

(Second Embodiment)

Hereinafter a second embodiment of the present invention will be described with reference to FIGS. 11 through 15. A description of those portions which are identical to those in the first embodiment will be omitted.

Figure 11:
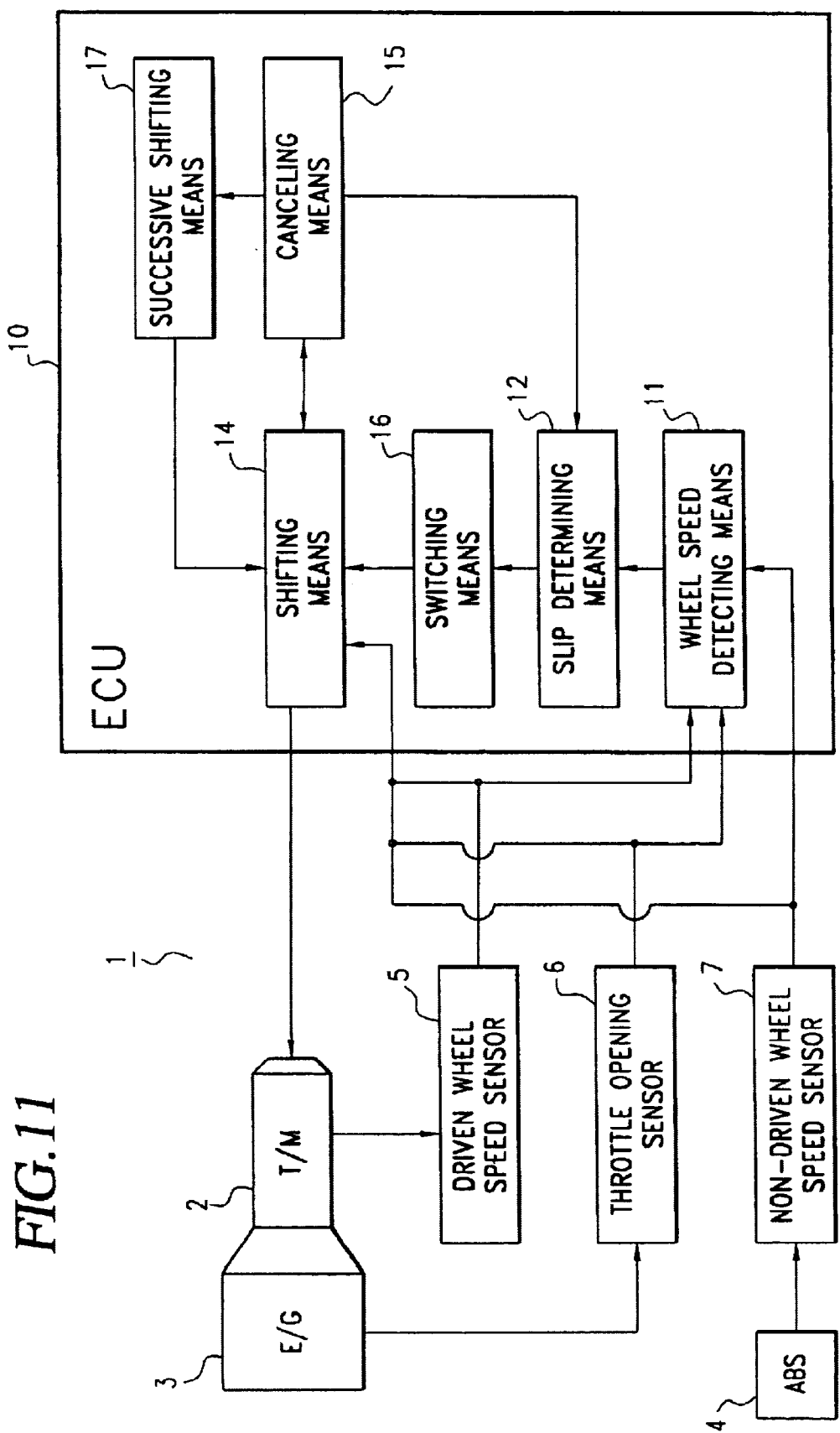
FIG. 11 is a block view of a shift control apparatus for an automatic transmission according to a second embodiment of the present invention.

As shown in FIG. 11, a shift control apparatus for an automatic transmission according to this embodiment includes and engine 3, automatic transmission 2, ABS 4, and a control unit 10, just as did the first embodiment. Further, a driven wheel speed sensor 5 is disposed on the output shaft of the automatic transmission 2, a throttle opening sensor 6 is disposed in the engine 3, and a non-driven wheel speed sensor 7 is provided in the ABS 4. The control unit 10 includes wheel speed detecting means 11, slip determining means 12, shifting means 14, canceling means 15, and successive shifting means 17. According to this embodiment, the control unit 10 also includes switching means 16 for switching the speed of wheels for referencing a map, for example, from the speed of the driven wheels Na to the speed of the non-driven wheels Nb.

Figure 12:
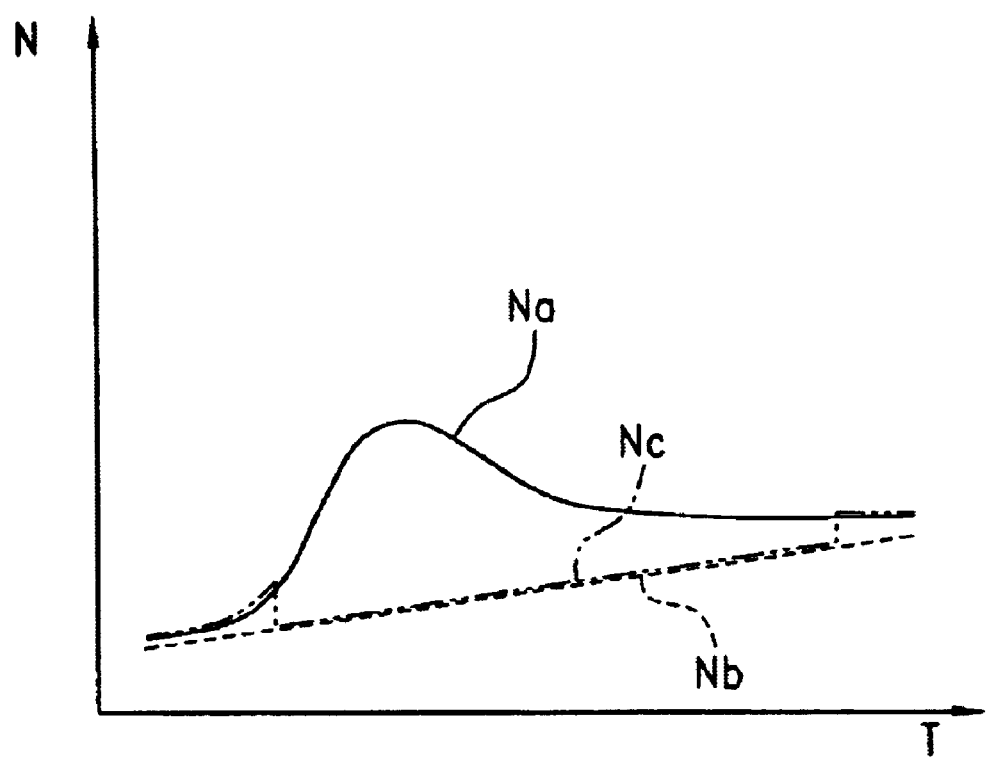
FIG. 12 is a time chart showing the speeds of driven wheels and non-driven wheels during slip.

When slip occurs, a difference in speed is generated between the speed of the driven wheels Na and the speed of the non-driven wheels Nb, as shown in FIG. 12. In this embodiment, when the slip determining means 12 outputs a slip signal based on the wheel speed detecting means 11, a switch is performed by the switching means 16 such that the gear stage originally referencing the map 20 based on the speed of the driven wheels Na references based on the speed of the non-driven wheels Nb. That is, the gear stage is referenced based on the speed for slip control denoted by the reference character Nc in FIG. 12. It should be noted that in the second embodiment, just as in the first embodiment, the slip determining means 12 has conditions for starting slip control, which are such that a slip signal is output only when the throttle opening is within a predetermined range, the speed of the non-driven wheels Nb is equal to or less than a predetermined speed, and vehicle posture control is not be being performed.

Figure 13A:
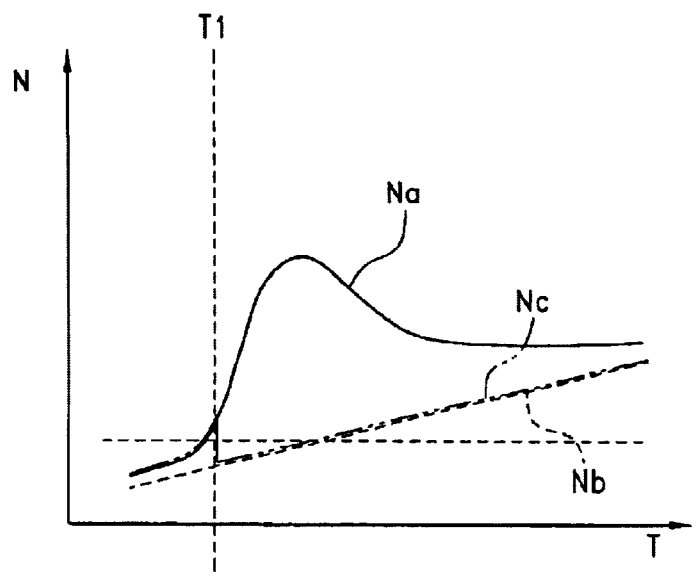
FIG. 13 shows a state in which there is continued slip, with (a) being a time chart showing the speeds of the driven wheels and the non-driven wheels, and the speed for slip control, (b) being a time chart showing the difference in speed between driven wheels and non-driven wheels, and (c) being a time chart showing gear stages.
Figure 13B:
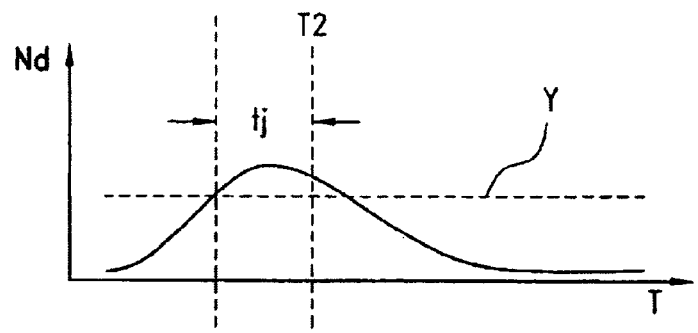
Figure 13C:
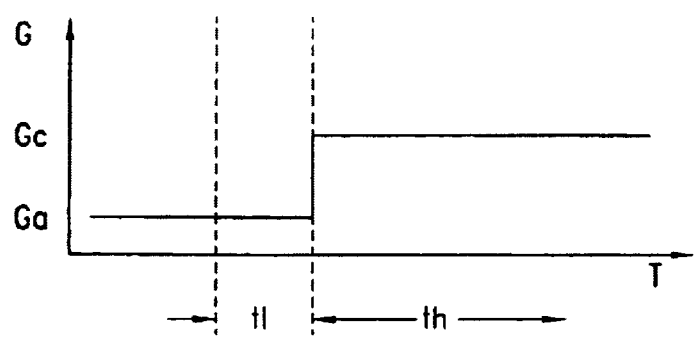

If slip occurs at time T1, as shown in FIG. 13(*a*), a difference in speed Nd between the speed of the driven wheels Na and the speed of the non-driven wheels Nb is generated, and the slip determining means 12 outputs a slip signal through the wheel speed detecting means 11 based on the fact that the difference in speed Nd is exceeding the predetermined threshold Y. The switching means 16, into which the slip signal was input, switches from the speed of the driven wheels Na to the speed of the non-driven wheels Nb, i.e., it references the gear stage from the map based on the speed for slip control Nc. When this happens, the shifting means 14 maintains the gear stage Ga based on the speed of the non-driven wheels Nb, as shown in FIG. 13(*c*), because the non-driven wheels, not shown, are not slipping.

If slip continues at time T2, as shown in FIG. 13(*b*), after the gear stage Ga (for example, first speed) is maintained based on the speed of the non-driven wheels Nb from the time T1 to time T2, which is the slip determination time (a predetermined period of time) tj, then a slip signal from the slip determining means 12 continues to be input into the shifting means 14 of which the slip signal was input at time T1 because the difference in speed Nd exceeds the predetermined threshold Y. Therefore, the shifting means 14 outputs a slip shift signal to the automatic transmission 2 so as to shift into the gear stage Gc (for example, third speed) based on the slip signal. When this happens, the automatic transmission is shifted into the gear stage Gc at time T2 as shown in FIG. 13(*c*). This then reduces the driving force transmitted to the driven wheels thus preventing slip from continuing.

Figure 14A:
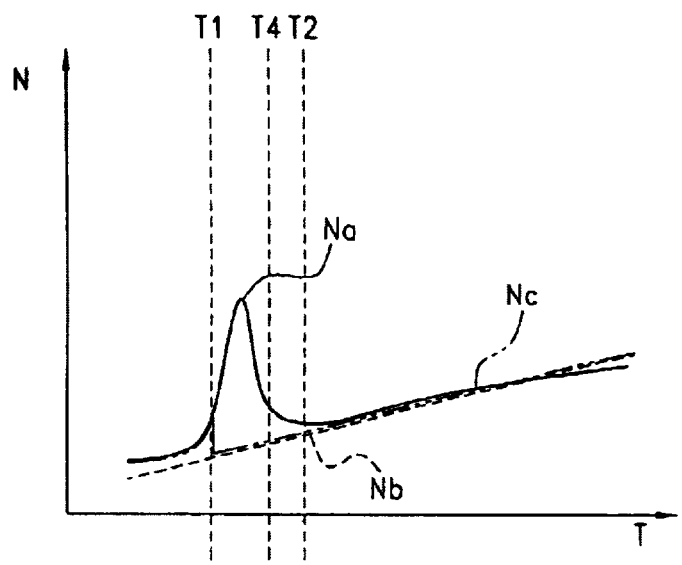
FIG. 14 shows a state in which there is temporary slip, with (a) being a time chart showing the speeds of the driven wheels and the non-driven wheels, and the speed for slip control, (b) being a time chart showing the difference in speed between driven wheels and non-driven wheels, and (c) being a time chart showing gear stages.
Figure 14B:
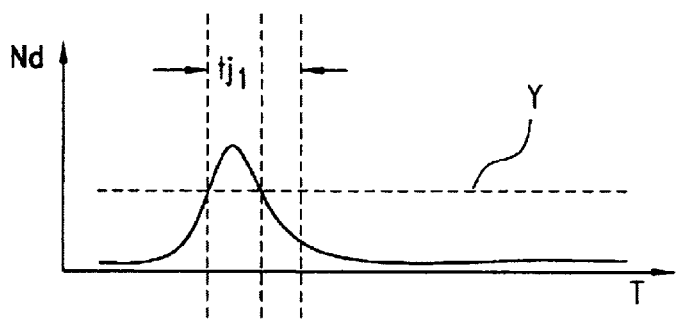
Figure 14C:
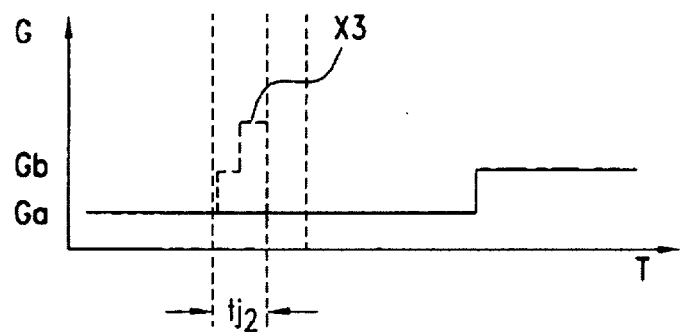
Figure 15A:
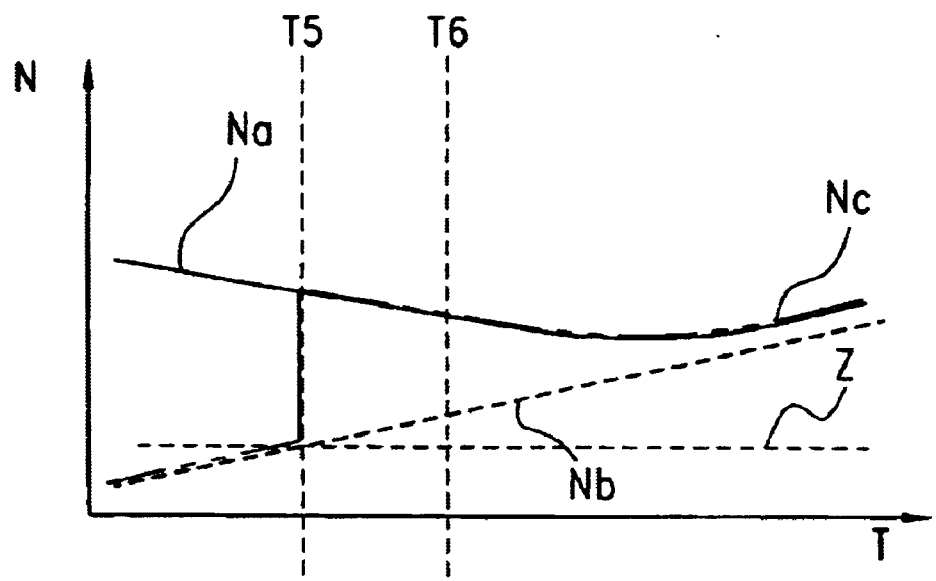
FIG. 15 shows a state in which slip control is canceled, with (a) being a time chart showing the difference in speed between driven wheels and non-driven wheels, and (b) being a time chart showing gear stages.
Figure 15B:
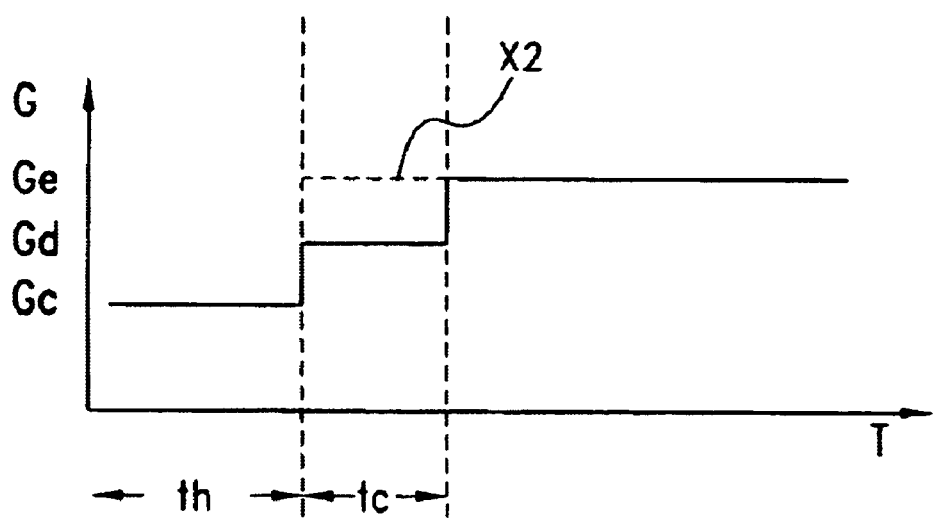

On the other hand, if the slip is only temporary and stops at the time T4, as shown in FIG. 14(*a*), then the difference in speed Nd within a slip determination time $tj_1$ is under the predetermined threshold Y and output of the slip signal from the slip determining means 12 is ended. When this happens, the shifting means 14 switches again from the speed of the non-driven wheels Nb to the speed of the driven wheels Na, i.e. it references the map 20 based on the speed for slip control Nc. Then, as shown in FIG. 14(*c*), slip determination ends according to a slip determination time $tj_2$ which is shorter than the slip determination time $tj_1$ and the running state of the vehicle returns to the normal running state. Accordingly, shifting based on the speed of the driven wheels Na, as shown by the broken line X3 in the figure, is prevented and in the case of temporary slip, slip control can be ended with the gear stage Ga still being maintained. That is, shifting once to a high speed is eliminated so that a feeling of discomfort to the driver is also eliminated or reduced and the necessary driving force is able to be obtained.

In the case of shifting to the gear stage Gc in the manner described above, as shown in FIG. 15(*a*), during the high gear stage maintaining time th a slip signal is output to the switching means 16 such that shifting is performed based on the speed of the non-driven wheels Nb until the speed of the non-driven wheels Nb reaches an up-shift shifting point Z from the gear stage Gc able to be obtained referencing the map 20. That is, because the speed of the non-driven wheels Nb does not reach the up-shift shifting point Z during the high gear stage maintaining time th, the gear stage Gc is maintained. When the speed of the non-driven wheels Nb becomes greater than the up-shift shifting point Z from the gear stage Gc at a time T5, a cancel signal is input to the slip determining means 12 by the canceling means 15 such that the slip determining means 12 stops outputting the slip signal. When this happens, the slip signal is canceled and the speed for slip control Nc switches from the speed of the non-driven wheels Nb to the speed of the driven wheels Na.

At this time, if the gear stage based on the speed of the driven wheels Na is, for example, the gear stage Ge (for example, fifth speed) shown by the broken line X2 in the figure, the automatic transmission is shifted from the gear stage Gc (for example, third speed) to the gear stage Ge (for example, fifth speed) at the time T5. Then the canceling means 15 also outputs a cancel signal to the successive shifting means 17. The successive shifting means 17 into which the cancel signal was input then outputs a shift signal such that a shift is performed once to the gear stage Gd, and then outputs a shift signal to the shifting means 14 such that a shift is further performed to the gear stage Ge after the predetermined period of time tc has passed. After this the running state of the vehicle returns to the normal running state. That is, the successive shifting means 17 performs successive shifting each predetermined period of time tc when the difference in speeds caused by the difference in speed Nd between the driven wheels and the non-driven wheels when slip control is canceled is two or more steps. This eliminates or reduces a feeling of discomfort to the driver and enables the necessary driving force to be obtained even when the aforementioned slip control ends.

It should be noted that in the first and second embodiments above, the gear stage Ga is a gear stage at the point during which slip occurs and is not limited to first speed. Furthermore in the above embodiments, the gear stages Gb, Gc, Gd, and Ge are successive gear stages; however the gear stage Gc for reducing transmission torque is not limited to third speed, but may be any speed which reduces transmission torque. Moreover, the first and second embodiments were described in terms of a five speed transmission, from the gear stage Ga through the gear stage Ge, for example; however, the present invention is not limited thereto but may also be applied, for example, to a four speed transmission or a six speed transmission, or to any multi-speed transmission to which application of the present invention is possible. Also, in the foregoing first and second embodiments, the speed of the driven wheels is detected by the automatic transmission 2 and the speed of the non-driven wheels is detected by the ABS 4; however, the present invention is not limited thereto. Any means may be used which can detect the speeds of the driven wheels and the non-driven wheels.

What is claimed is:

1. A shift control apparatus for an automatic transmission in a wheeled vehicle, comprising:

an automatic transmission for changing input speed of rotation of an input shaft to an output speed based on a running state of the vehicle and outputting rotation at the output speed to an output shaft;

wheel speed detecting means for detecting wheel speed of a wheel;

slip determining means for determining slip based on the wheel speed detected by said wheel speed detecting means and outputting a slip signal corresponding to the determined slip;

shifting means for outputting a shift signal for a predetermined gear stage which reduces driving force, when the slip signal is continuing after a predetermined time has passed since start of the slip signal; and maintaining means for outputting a maintaining signal for maintaining, for a predetermined time from a point at which the slip signal was input, a gear stage at the point at which the slip signal was input.

2. The shift control apparatus for an automatic transmission according to claim 1, wherein the wheel speed detecting means detects speeds of a driven wheel and a non-driven wheel, and the slip determining means determines slip based on a difference in speed between the driven wheel and the non-driven wheel.

3. The shift control apparatus for an automatic transmission according to claim 2, further comprising canceling means for outputting a cancel signal to cancel a shift signal output from the shifting means to the automatic transmission based on the running state of the vehicle when the output shift signal matches a shift signal for the predetermined gear stage.

4. The shift control apparatus for an automatic transmission according to claim 3, wherein the running state of the vehicle which becomes a basis for the cancel signal from the canceling means is determined based on the speed of the non-driven wheel.

5. The shift control apparatus for an automatic transmission according to claim 3, further comprising successive shifting means for successively upshifting through plural gear stages, with each successively higher gear stage being held for a predetermined period of time, until reaching the predetermined stage which matches the running state of the vehicle, at which time the cancel signal is output by the canceling means.

6. The shift control apparatus for an automatic transmission according to claim 1, further comprising canceling means for outputting a cancel signal to cancel the shift signal output from the shifting means to the automatic transmission based on the running state of the vehicle when that shift signal matches a shift signal for the predetermined gear stage.

7. The shift control apparatus for an automatic transmission according to claim 6, wherein the running state of the vehicle which becomes a basis for the cancel signal from the canceling means is determined based on the speed of the non-driven wheel.

8. The shift control apparatus for an automatic transmission according to claim 6, further comprising successive shifting means for successively upshifting through plural gear stages, with each successively higher gear stage being held for a predetermined period of time, until reaching the predetermined gear stage which matches the running state of the vehicle, at which time the cancel signal is output by the canceling means.

9. The shift control apparatus for an automatic transmission according to claim 1, wherein the slip determining means is able to output a slip signal only when the speed of the non-driven wheel is equal to or less than a predetermined speed.

10. The shift control apparatus for an automatic transmission according to claim 1, wherein the slip determining means is able to output a slip signal only when an accelerator opening is within a predetermined range.

11. The shift control apparatus for an automatic transmission according to claim 1, wherein the slip determining means is able to output a slip signal only when vehicle posture control is not being performed.

12. The shift control apparatus for an automatic transmission according to claim 1, wherein the predetermined gear stage according to the shifting means is a middle gear stage which is lower than a highest gear stage.

13. A shift control apparatus for an automatic transmission mounted in a vehicle, comprising:

an automatic transmission for changing input speed of rotation of an input shaft to an output speed based on a running state of the vehicle and outputting rotation at the output speed to an output shaft;

wheel speed detecting means for detecting wheel speeds of a driven wheel and a non-driven wheel;

slip determining means for determining slip based on the wheel speeds detected by said wheel speed detecting means and outputting a slip signal corresponding to the determined slip;

shifting means for outputting a shift signal for a predetermined gear stage which reduces driving force, when the slip signal is continuing after a predetermined time has passed since start of the slip signal; and switching means for switching from determination of the running state of the vehicle based on the speed of the driven wheel to determination of the running state of the vehicle based on the speed of the non-driven wheel, on the basis of input of the slip signal from the slip determining means.

14. The shift control apparatus for an automatic transmission according to claim 13, wherein the switching means switches from determination of the running state of the vehicle based on the speed of the non-driven wheel to determination of the running state of the vehicle based on the speed of the driven wheel, in a state in which input of the slip signal has been stopped.

15. The shift control apparatus for an automatic transmission according to claim 13, further comprising canceling means for outputting a cancel signal to cancel a shift signal output from the shifting means to the automatic transmission based on the running state of the vehicle when that shift signal matches a shift signal for the predetermined gear stage.

16. The shift control apparatus for an automatic transmission according to claim 15, wherein the running state of the vehicle, which becomes a basis for the cancel signal, is determined based on the speed of the non-driven wheel switched by the switching means, while at the same time the cancel signal is output, the switching means switches again from determination based on the speed of the non-driven wheel to determination based on the speed of the driven wheel.

17. The shift control apparatus for an automatic transmission according to claim 15, further comprising successive shifting means for successively upshifting through plural gear stages, with each successively higher gear stage being held for a predetermined period of time, until reaching the predetermined gear stage which matches the running state of the vehicle, at which time the cancel signal is output by the canceling means.

18. The shift control apparatus for an automatic transmission according to claim 14, further comprising canceling means for outputting a cancel signal to cancel a shift signal output from the shifting means to the automatic transmission based on the running state of the vehicle when that shift signal matches a shift signal for the predetermined gear stage.

19. The shift control apparatus for an automatic transmission according to claim 18, wherein the running state of the vehicle, which becomes a basis for the cancel signal, is determined based on the speed of the non-driven wheel switched by the switching means, while at the same time the cancel signal is output, the switching means switches again from determination based on the speed of the non-driven wheel to determination based on the speed of the driven wheel.

20. The shift control apparatus for an automatic transmission according to claim 18 further comprising successive shifting means for successively upshifting through plural gear stages, with each successively higher gear stage being held for a predetermined period of time, until reaching the predetermined gear stage which matches the running state of the vehicle, at which time the cancel signal is output by the canceling means.

21. The shift control apparatus for an automatic transmission according to claim 13, wherein the slip determining means is able to output a slip signal only when the speed of the non-driven wheel is equal to or less than a predetermined speed.

22. The shift control apparatus for an automatic transmission according to claim 13, wherein the slip determining means is able to output a slip signal only when an accelerator opening is within a predetermined range.

23. The shift control apparatus for an automatic transmission according to claim 13, wherein the slip determining means is able to output a slip signal only when vehicle posture control is not being performed.

24. The shift control apparatus for an automatic transmission according to claim 13, wherein the predetermined gear stage according to the shifting means is a middle gear stage which is lower than a highest gear stage.

* * * * *